(12) United States Patent
Lau

(10) Patent No.: US 8,114,498 B2
(45) Date of Patent: Feb. 14, 2012

(54) BONDED ELASTIC

(75) Inventor: Wai Ching Andy Lau, Hong Kong (HK)

(73) Assignee: Clover Group International Limited, Kowloon (HK)

( * ) Notice: Subject to any disclaimer, the term of this patent is extended or adjusted under 35 U.S.C. 154(b) by 73 days.

(21) Appl. No.: 12/705,382

(22) Filed: Feb. 12, 2010

(65) Prior Publication Data

US 2010/0143688 A1 Jun. 10, 2010

Related U.S. Application Data

(62) Division of application No. 11/854,801, filed on Sep. 13, 2007, now Pat. No. 7,678,220.

(60) Provisional application No. 60/827,218, filed on Sep. 28, 2006.

(51) Int. Cl.
*B32B 3/04* (2006.01)

(52) U.S. Cl. ......................... 428/124; 428/122

(58) Field of Classification Search .................. 428/124, 428/122; 2/275
See application file for complete search history.

(56) References Cited

U.S. PATENT DOCUMENTS

| | | | |
|---|---|---|---|
| 3,097,364 A | 7/1963 | Hess | |
| 3,168,749 A | 2/1965 | Cala | |
| 3,328,809 A | 7/1967 | Payne et al. | |
| 5,782,191 A | 7/1998 | Wong | |
| 6,070,542 A | 6/2000 | Wong | |
| 7,005,021 B2 | 2/2006 | Kramer | |
| 7,191,720 B2 * | 3/2007 | Thomas | 112/475.09 |
| 2004/0151864 A1 | 8/2004 | Thomas | |

FOREIGN PATENT DOCUMENTS

| | | |
|---|---|---|
| GB | 1324591 A | 7/1973 |
| GB | 2241424 A | 9/1991 |
| JP | 8-209419 A | 8/1996 |
| WO | WO 2005/084944 | 9/2005 |

OTHER PUBLICATIONS

International Search Report dated Jan. 3, 2008 for PCT Application Serial No. PCT/CN2007/002785.

* cited by examiner

*Primary Examiner* — Alexander Thomas

(74) *Attorney, Agent, or Firm* — Muncy, Geissler, Olds & Lowe, PLLC

(57) ABSTRACT

A method of making a bonded hem includes sandwiching a body member between a first adhesive film and a second adhesive film, placing a fabric sheet upon the first adhesive film and fusing the first adhesive film to bond onto the body member and the fabric sheet, flipping the fabric sheet to form a first fold line and a second fold line, and fusing the second adhesive film to bond onto the fabric sheet to form the bonded hem.

6 Claims, 4 Drawing Sheets

US 8,114,498 B2

BONDED ELASTIC

CROSS REFERENCE TO RELATED APPLICATION

This application is a divisional application of an allowed U.S. application Ser. No. 11/854,801, filed Sep. 13, 2007 now U.S. Pat. No. 7,678,220, which claims the benefit of U.S. Provisional Application No. 60/827,218, filed Sep. 28, 2006, the contents of which are hereby incorporated herein by reference.

BACKGROUND

Traditionally, elastic ribbons as used in hems, seams, straps and other parts of undergarments have been stitched in places nearby the fabric edge with zigzag laid down and folded elastic ribbon. However, the stitching can come loose to cause unsightly fraying, and the fabric edge can cause discomfort to a user. Moreover, stitching elastic to fabric can be a time-consuming process.

Consequently, it is desirable to develop elastic ribbons with improved structural integrity and comfort. It is also desirable to provide an improved means of attaching elastic to fabric.

SUMMARY

According to one aspect, a method of making a bonded hem includes sandwiching a body member between a first adhesive film and a second adhesive film, placing a fabric sheet upon the first adhesive film, fusing the first adhesive film to bond onto the body member and the fabric sheet, flipping the fabric sheet to form a first fold line and a second fold line, and fusing the second adhesive film to bond onto the fabric sheet to form the bonded hem.

According to another aspect, another method of making a bonded hem includes sandwiching a body member between a first adhesive film and a second adhesive film, placing an edge of a fabric sheet upon the first adhesive film, fusing the first adhesive film to bond onto the body member and the fabric sheet, flipping the fabric sheet to form a single fold line, and fusing the second adhesive film to bond onto the fabric sheet to form the bonded hem.

According to a further aspect, a bonded hem may include a body member, a first adhesive film on a first side of the body member, a second adhesive film on a second side of the body member, a folded fabric sheet extended about the body member along a fold line and fused to the first and second adhesive films, and an unfused seam margin formed inwardly from the fold line.

According to another aspect, a bonded hem may include a body member, an adhesive film folded about the body member, a folded fabric sheet extended about the body member along a fold line and fused to the adhesive film, and an unfused seam margin formed inwardly from the fold line.

DETAILED DESCRIPTION

Figure 1:
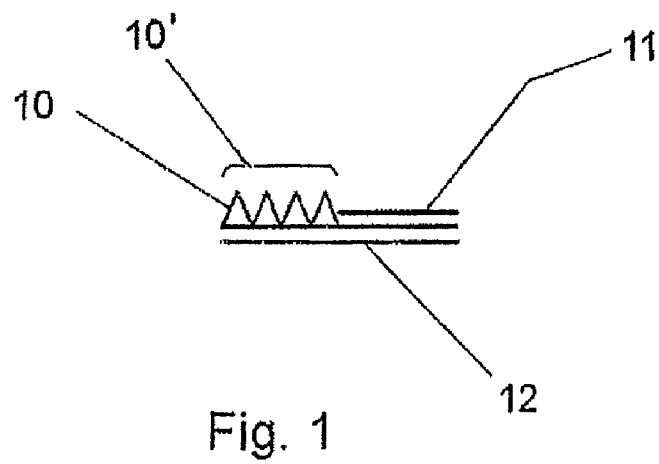
FIG. 1 depicts the first step of a first method of making a bonded hem in a sheet of fabric.

Reference will now be made in detail to a particular embodiment of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the invention is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims. In addition, improvements and modifications which may become apparent to persons of ordinary skill in the art after reading this disclosure, the drawings, and the appended claims are deemed within the spirit and scope of the present invention.

A method of making a bonded hem 20 includes sandwiching a body member 10 between a first adhesive film 11 and a second adhesive film 12, placing a fabric sheet 13 upon the first adhesive film 11, fusing the first adhesive film 11 to bond onto the body member 10 and the fabric sheet 13, flipping the fabric sheet 13 to form a first fold line F1 and a second fold line F2, and fusing the second adhesive film 12 to bond onto the fabric sheet 13 to form the bonded hem 20, as depicted in FIGS. 1 to 4.

In the first step, the body member 10 may be sandwiched between the first adhesive film 11 and the second adhesive film 12, as depicted in FIG. 1. The first adhesive film 11 and the second adhesive film 12 may be separate, or they may be a single adhesive film folded about the body member 10. For example, the body member 10 may be an elastic ribbon. The adhesive films 11 and 12 may be made of polyurethane, thermo-adhesive, or any other suitable material known to one skilled in the art. For example, adhesive films 11 and 12 may include thermally activated adhesive that can melt under the application of heat from an iron or press. The first adhesive film 11 may not be as wide as the second adhesive film 12, and preferably is about half the width of the second adhesive film 12.

Figure 2:
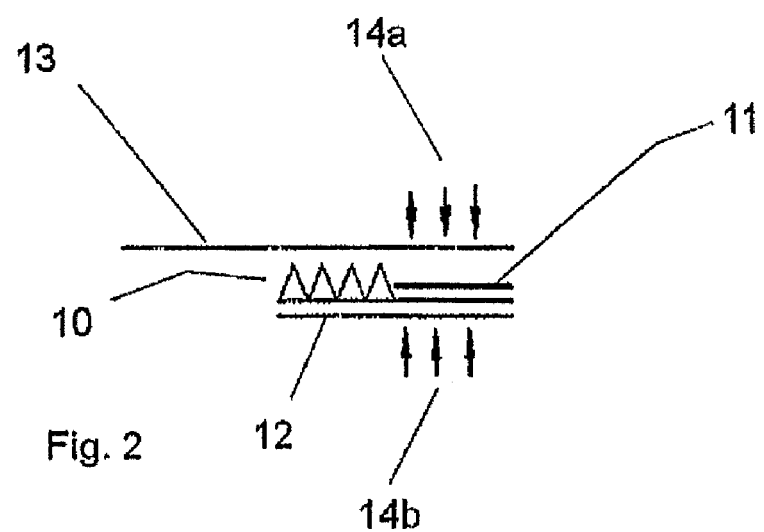
FIG. 2 depicts the second step of the first method of making a bonded hem in a sheet of fabric.

In the second step, the fabric sheet 13 may be placed upon the body member 10 and first adhesive film 11, and may extend away from the body member 10, as depicted in FIG. 2. The fabric sheet 13 may be made of polyester, cotton, nylon, nylon lycra, or any other suitable material known to one skilled in the art. Heat and pressure may be applied to fuse the first adhesive film 11 and to cause bonding to both the body member 10 and the fabric sheet 13, as indicated by arrows 14a. Optionally, heat and pressure may also be applied to fuse the second adhesive film 12, as indicated by arrows 14b.

Figure 3:
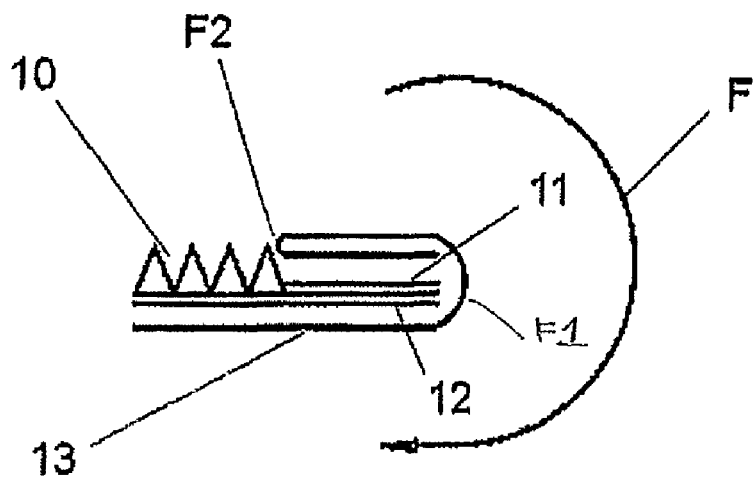
FIG. 3 depicts the third step of the first method of making a bonded hem in a sheet of fabric.

In the third step, the fabric sheet 13 may be flipped over in the direction of arrow F to form the first fold line F1 and the second fold line F2, as depicted in FIG. 3. The fabric sheet 13 may extend around both adhesive films 11 and 12 to the under-side of the body member 10, as depicted in FIG. 4.

Figure 4:
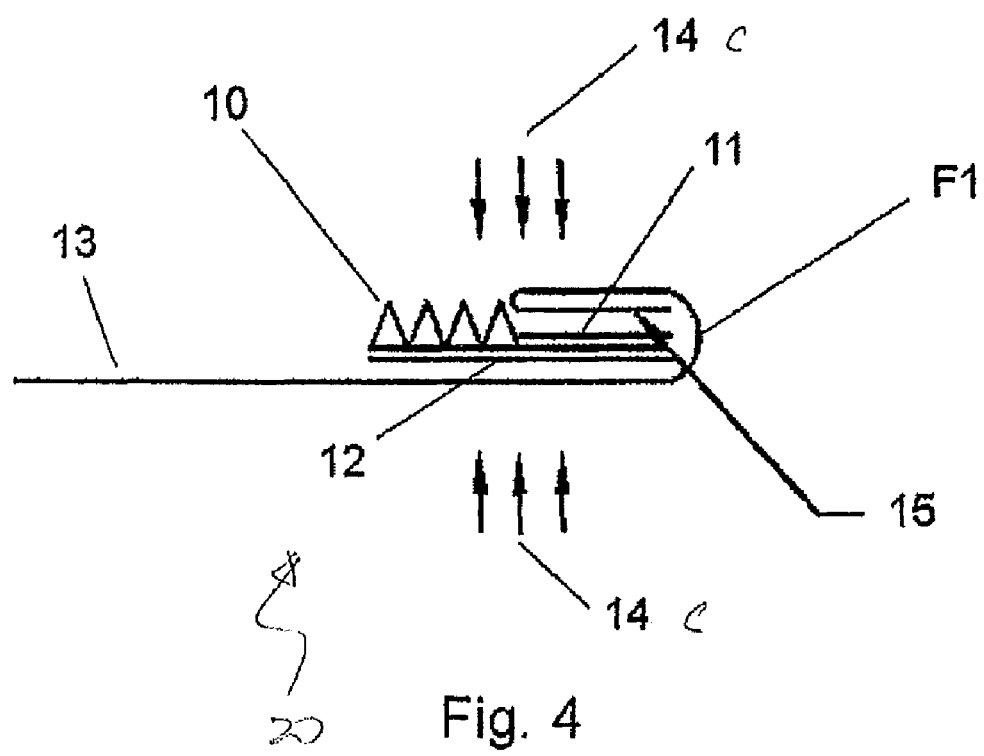
FIG. 4 depicts the fourth step of the first method of making a bonded hem in a sheet of fabric.

In the fourth step, heat and pressure may be applied as indicated by arrows 14c to fuse the second adhesive film 12 to cause bonding to the fabric sheet 13 and to form the bonded hem 20 with a permanent stitchless seam, as depicted in FIG. 4. Preferably, heat and pressure may be applied to a band 15 that is spaced inwardly from the first fold line F1, thereby leaving an unfused seam margin around an edge zone.

Consequently, the first fold line F1 may cover the edges of the fabric sheet 13, the body member 10, and the films 11 and 12, which makes the seam so formed on a garment less skin-irritating and more comfortable to a user. Moreover, the skin-facing side of the body member 10 may be initially formed with an optional raised fleecy surface 10', as depicted in FIG. 1, which may provide additional softness to the garment and comfort to the user. The optional raised fleecy surface 10' may be formed, for example, by brushing or scratching.

Another method of making a bonded hem 20' includes sandwiching a body member 10" between a first adhesive film 11' and a second adhesive film 12', placing an edge 16 of a fabric sheet 13' upon the first adhesive film 11', fusing the first adhesive film 11' to bond onto the body member 10" and the fabric sheet 13', flipping the fabric sheet 13' to form a single fold line F1', and fusing the second adhesive film 12' to bond onto the fabric sheet 13' to form the bonded hem 20', as depicted in FIGS. 5 to 8.

Figure 5:
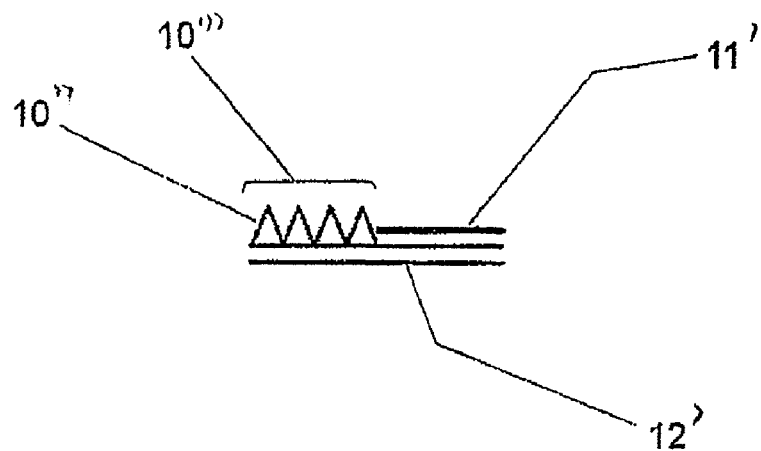
FIG. 5 depicts the first step of a second method of making a bonded hem in a sheet of fabric.

In the first step, the body member 10" may be sandwiched between the first adhesive film 11' and the second adhesive film 12', as depicted in FIG. 5. The first adhesive film 11' and the second adhesive film 12' may be separate, or they may be a single adhesive film folded about the body member 10". For example, the body member 10" may be an elastic ribbon. The adhesive films 11' and 12' may be made of polyurethane, thermo-adhesive, or any other suitable material known to one skilled in the art. For example, adhesive films 11' and 12' may include thermally activated adhesive that can melt under the application of heat from an iron or press. The first adhesive film 11' may not be as wide as the second adhesive film 12', and preferably is about half the width of the second adhesive film 12'.

Figure 6:
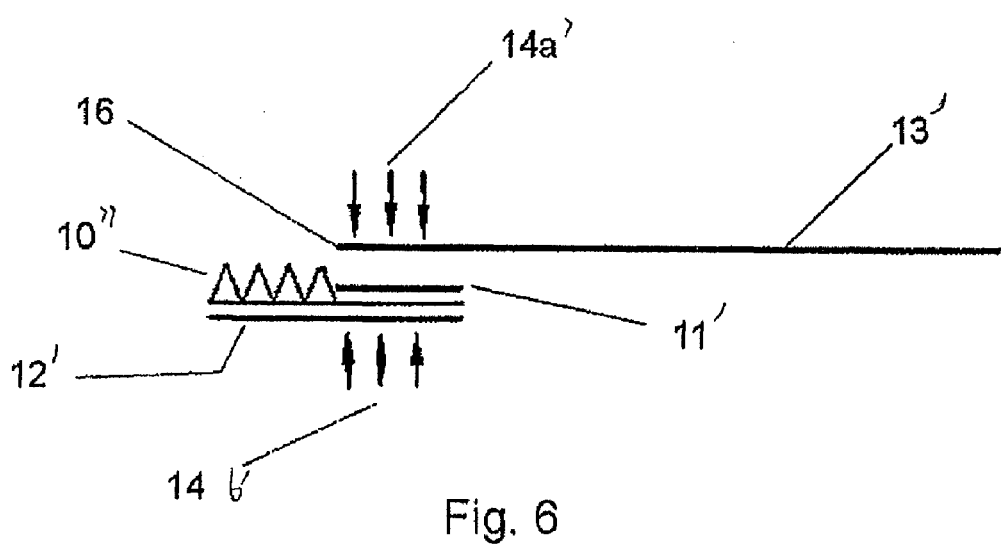
FIG. 6 depicts the second step of the second method of making a bonded hem in a sheet of fabric.

In the second step, the edge 16 of the fabric sheet 13' may then be placed upon the body member 10" and first adhesive film 11', and may extend away from the body member 10", as depicted in FIG. 6. The fabric sheet 13' may be made of polyester, cotton, nylon, nylon lycra, or any other suitable material known to one of skilled in the art. The edge 16 of the fabric sheet 13' may be formed by cutting the fabric sheet 13' using an ultrasonic cutting machine, although other machines that are known to one skilled in the art may also be used. Heat and pressure may be applied to fuse the first adhesive film 11' and to cause bonding to both the body member 10" and the fabric sheet 13', as indicated by arrows 14a'. Optionally, heat and pressure may also be applied to fuse the second adhesive film 12', as indicated by arrows 14b'.

Figure 7:
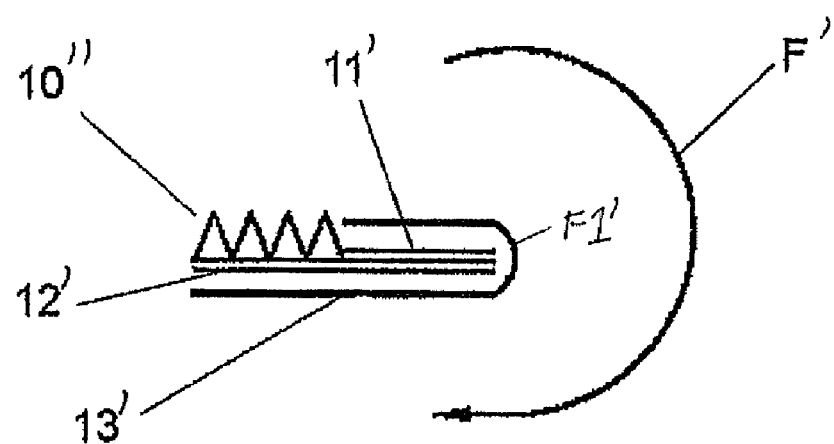
FIG. 7 depicts the third step of the second method of making a bonded hem in a sheet of fabric.

In the third step, the fabric sheet 13' may be flipped over in the direction of arrow F' to form the single fold line F1', as depicted in FIG. 7. The fabric sheet 13' may extend around both adhesive films 11' and 12' to the under-side of the body member 10", as depicted in FIG. 8.

Figure 8:
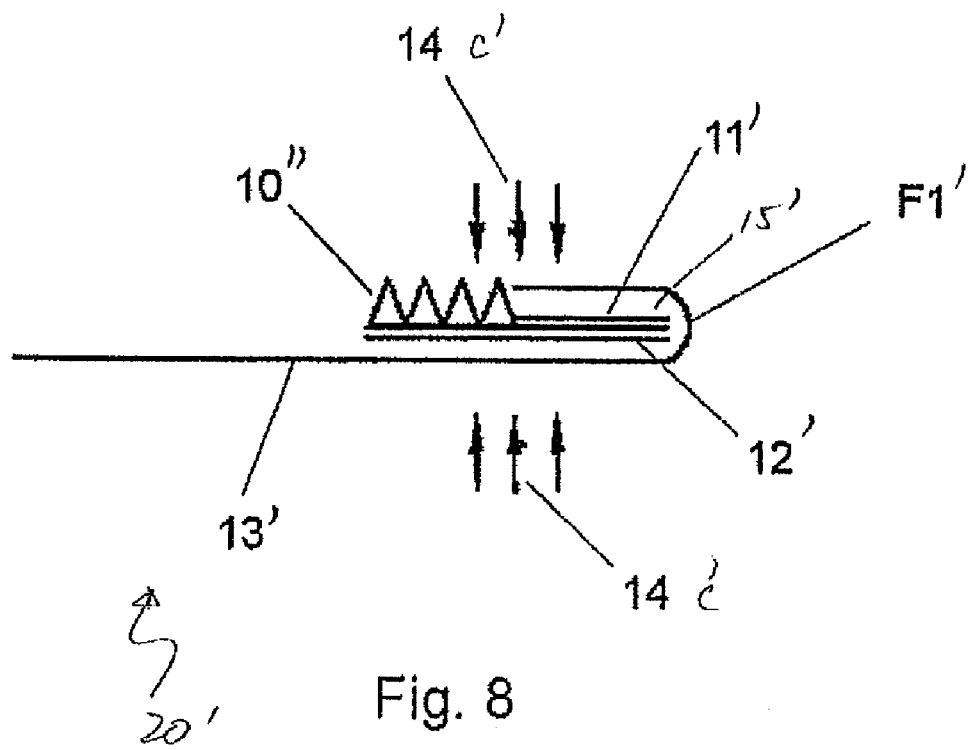
FIG. 8 depicts the fourth step of the second method of making a bonded hem in a sheet of fabric.

In the fourth step, heat and pressure may be applied as indicated by arrows 14c' to fuse the second adhesive film 12' to cause bonding to the fabric sheet 13' and to form the bonded hem 20' with a permanent stitchless seam, as depicted in FIG. 8. Preferably, heat and pressure may be applied to a band 15' that is spaced inwardly from the fold line F1', thereby leaving an unfused seam margin around an edge zone.

Consequently, the first fold line F1' may cover the edges of the fabric sheet 13', the body member 10", and the films 11' and 12', which makes the seam so formed on a garment less skin-irritating and more comfortable to a user. Moreover, the skin-facing side of the body member 10" may be initially formed with an optional raised fleecy surface 10''', as depicted in FIG. 5, which may provide additional softness to the garment and comfort to the user. The optional raised fleecy surface 10''' may be formed, for example, by brushing or scratching.

A bonded hem 20 may include the body member 10, the first adhesive film 11 on a first side of the body member 10, the second adhesive film 12 on a second side of the body member 10, the folded fabric sheet 13 extended about the body member 10 along a fold line F1 and fused to the first and second adhesive films 11 and 12, and an unfused seam margin formed inwardly from the fold line F1, as depicted in FIG. 4. The first and second adhesive films 11 and 12 may be separate films, or they may be a single adhesive film folded about the body member 10.

A bonded hem 20' may include the body member 10", the first adhesive film 11' on a first side of the body member 10", the second adhesive film 12' on a second side of the body member 10", the folded fabric sheet 13' extended about the body member 10" along a fold line F1' and fused to the first and second adhesive films 11' and 12', and an unfused seam margin formed inwardly from the fold line F1', as depicted in FIG. 8. The first and second adhesive films 11' and 12' may be separate films, or they may be a single adhesive film folded about the body member 10".

It should be appreciated that modifications and alterations obvious to those skilled in the art are not to be considered as beyond the scope of the present invention. More particularly, although not exclusively, the invention relates to elastic hems, seams, straps and the like for garments.

While the examples of the methods and products have been described, it should be understood that the methods and products are not so limited, and modifications may be made. The scope of the method and products is defined by the appended claims, and all methods and products that come within the meaning of the claims, either literally or by equivalence, are intended to be embraced therein.

What is claimed is:

1. A bonded hem, comprising:
   an elastic body member sandwiched between a first adhesive film and a second adhesive film;
   a folded fabric sheet extended about said elastic body member along a single fold and fused to said first and second adhesive films;
   an unfused seam margin formed inwardly from said single fold; and
   a raised fleecy surface on one side of said elastic body member.

2. The bonded hem of claim 1, wherein said elastic body member is an elastic ribbon.

3. The bonded hem of claim 1, wherein said adhesive films are made of thermo-adhesive.

4. The bonded hem of claim 1, wherein said first adhesive film is about half the width of said second adhesive film.

5. The bonded hem of claim 1, wherein said fabric sheet is selected from the group consisting of polyester, cotton, nylon, nylon lycra, or combinations thereof.

6. The bonded hem of claim 1, wherein said first adhesive film and said second adhesive film comprise separate adhesive film elements.

* * * * *